July 24, 1962  B. BRASSEUR ETAL  3,046,098
DEVICE FOR DETERMINING THE CONTENT OF WATER VAPOUR IN A GAS FLOW
Filed Nov. 4, 1958

INVENTOR
BERNARD BRASSEUR
GEORGES LE GARGASSON
JEAN ROBERT PERILHOU

AGENT 3,046,098
DEVICE FOR DETERMINING THE CONTENT OF WATER VAPOUR IN A GAS FLOW
Bernard Brasseur, Arnonville-les-Gonesse, Georges Le Gargasson, Paris, and Jean Robert Perilhou, Bourg-la-Reine, France, assignors to North American Philips Company Inc., New York, N.Y., a corporation of Delaware
Filed Nov. 4, 1958, Ser. No. 771,811
Claims priority, application France Nov. 4, 1957
2 Claims. (Cl. 23—254)

This invention relates to devices for determining the content of water vapour in a gas flow, more particularly for installations in which the available water vapour might bring about corrosion.

It is already known to measure the presence of water vapour by means of a thin layer of phosphor pentoxide in which the water brings about electrolysis. With a concentration of one part to a million, for example, the time of response is several tens of seconds when the concentration is redoubled. However, this response is much too slow for several applications, for example for indicating the presence of water vapour in carbonic acid gas which is used as a heat-transportation agent in a nuclear reactor.

An object of the invention is to provide a device having a shorter time of response and also a higher sensitivity.

According to the invention, in a device for measuring the content of water vapour in a gas flow, the free oxygen present in the gas flow is removed if the measurement would be disturbed by it, the free hydrogen being measured or removed separately and the water present in the gas flow being decomposed with chemical binding of the oxygen and, subsequently, the pressure of the hydrogen being determined after diffusion thereof through a semi-permeable wall.

The device according to the invention affords the advantage that the semi-permeable wall permits of obtaining a short time of response and nevertheless a high accuracy. The substance most suitable for the semi-permeable wall is palladium. In this case it is generally necessary to ensure that the glowing palladium cannot come into contact with free hydrogen and oxygen simultaneously, since otherwise water may be produced and this could give a false impression of the water content.

In the device according to the invention, the free hydrogen may be measured prior to the decomposition of the water, or measured in a parallel flow, and the total pressure of hydrogen may be measured differentially with respect to that of the free hydrogen.

According to the invention, in the last-mentioned case, it is not necessary to remove the free oxygen if the content thereof is less than half the free hydrogen.

In order that the invention may be readily carried into effect, it will now be described in detail, by way of example, with reference to the accompanying drawing, in which.

Figure 1:
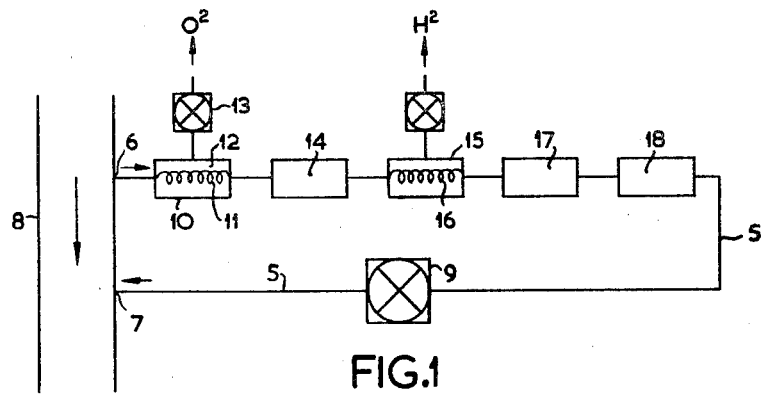
FIG. 1 shows a diagram of a measuring device according to the invention, in which all component parts are connected one after another.

Referring now to FIG. 1, reference numeral 8 indicates the line in which the gas flows in a direction indicated by the arrow. 6 and 7 are the connections of a parallel line 5 which contains in the first place a device 10 for removing the free oxygen from the gas flow. The device 10 comprises a semi-permeable tube 11, preferably of silver, which is maintained at a temperature of 700° C. in an exhausted space 12. Oxygen readily diffuses to the exterior through silver at 700° C. and is then carried off by a pump 13. 14 indicates a cooling device. The free hydrogen is removed in a device 15 by causing the gas to flow through a tube 16 of iron, nickel or palladium at 350° C. The free oxygen must have been removed beforehand, since otherwise on the glowing metal palladium water could be produced from oxygen and hydrogen. 17 contains substances capable of readily removing oxygen from water. Examples of such substances are: Alkaline earth or alkaline hydrides which enter into reaction with water whilst forming oxides. It is also possible to use iron or copper in a finely-divided state or alkaline metals themselves. By way of example, we may mention sodium, if desired alloyed with lead, and this is the liquid state at the desired reaction temperature so that the gas flow may be led through it. If desired, allowance may be made for the fact that only half of the hydrogen is liberated.

Carbon, silicon or boron in the red-hot state may also serve to remove the oxygen from the water. In addition, it is possible to use vanadium oxide and also $UO_2$ and $MnO$, which as a result of reaction with water change to $U_3O_8$ and $MnO_2$ respectively.

Furthermore, use may be made of special mixtures on aluminum basis in which the aluminum-oxide layer is removed with the aid of mercury chloride or sodium cyanide.

The gas flow through the system is maintained by means of pump 9.

Figure 2:
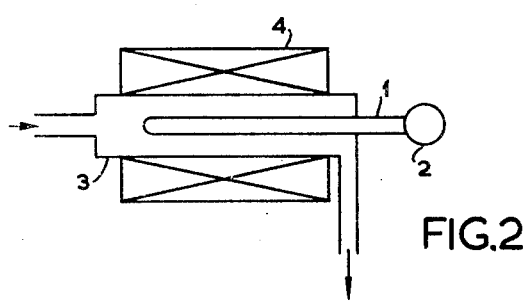
FIG. 2 shows the measuring section proper of FIG. 1.

The pressure of the liberated hydrogen is measured in the part 18, as will be explained more fully with reference to FIG. 2. A McLeod gauge 2 is connected to the palladium tube 1, the latter being contained in an envelope 3 through which the gas is led, and 4 is a heating or cooling element. If the tube 1 is maintained at the correct temperature of about 350° C., the indication of a variation in the pressure of the hydrogen from 0.25 to 0.5 mm. mercury may be obtained within about one second.

Figure 3:
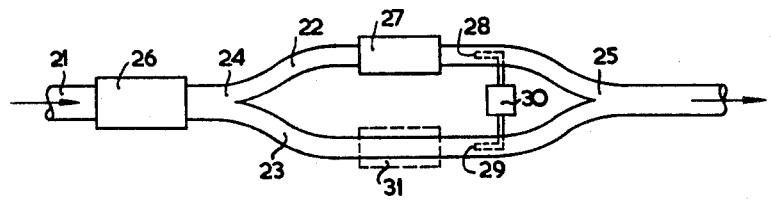
FIG. 3 shows a measuring device according to the invention with a parallel gas flow.

In FIG. 3, the gas flow is supplied through a line 21 and the free oxygen removed therefrom in a device 26. At 24, the line 24 is divided into parts 22 and 23 which recombine at 25. The water is decomposed in a device 27, as described with reference to FIG. 1. A palladium tube 28 is arranged in a similar manner as in FIG. 1 at 18 and shown in greater detail in FIG. 2. The line 23 also includes a glowing palladium tube 29 under exactly the same conditions as 28, the pressure difference in each of them being measured with the aid of a differential McLeod gauge 30.

A device 31 as shown in dotted line may be provided to prevent interference due to different total pressures at 28 and 29, the only feature of device 31 being that it has a resistance to flow equal to that of the device 27.

Since the differential McLeod gauge 30 indicates the difference in pressures between the free hydrogen and the sum of the free hydrogen and the liberated hydrogen, it is immaterial whether the pressure of the free hydrogen at the same time varies in the device at 28 and 29. If the oxygen content in the gases being tested is less than half the free hydrogen then upon reaction on the glowing palladium at 28 and 29 the free hydrogen can never disappear completely, so that the measurement cannot be detrimentally affected in this respect if the device 26 for removing the free oxygen is omitted.

What is claimed is:

1. In an apparatus for continuously measuring water vapour in a gas flow in a main conduit, a sampler conduit leading from said main conduit, gas permeable means located in said sampler conduit for selectively removing free oxygen from the gas flow in said sampler conduit, means downstream from said oxygen removing means for chemically liberating hydrogen from water vapour in said oxygen free gas flow, said hydrogen liberating means being in flow communication with said oxygen free gas and comprising a gas path determining structure containing substances capable of liberating hydrogen from water vapor, a gas permeable wall downstream from and connected to said hydrogen liberating means for selectively removing the liberated hydrogen from said sampler conduit, and a means downstream and in flow communication with said gas permeable wall for determining the pressure of the liberated hydrogen which diffuses through said gas permeable wall.

2. The apparatus of claim 1 wherein in addition there is located in the sampler conduit, between the means for removing free oxygen and the means for liberating hydrogen from water vapour, a gas permeable means for continuously removing free hydrogen.

References Cited in the file of this patent

UNITED STATES PATENTS

| | | |
|---|---|---|
| 1,825,024 | Tanberg | Sept. 29, 1931 |
| 2,633,737 | Richardson | Apr. 7, 1953 |
| 2,671,336 | Hulsberg | Mar. 9, 1954 |
| 2,787,903 | Beard | Apr. 9, 1957 |
| 2,848,306 | Blumer | Aug. 19, 1958 |

FOREIGN PATENTS

| | | |
|---|---|---|
| 361,279 | Great Britain | Nov. 19, 1931 |